3,036,063
ALKYLSULFONAMIDOBENZOIC ACID
COMPOUNDS
George B. De La Mater, St. Johns, and Philip E. Wiegert, St. Louis County, Mo., assignors to Mallinckrodt Chemical Works, St. Louis, Mo., a corporation of Missouri
No Drawing. Filed July 2, 1958, Ser. No. 746,072
11 Claims. (Cl. 260—211)

This invention relates to organic compounds and more particularly to certain novel benzoic acid derivatives.

Briefly, the present invention is directed to alkylsulfonamidobenzoic acid compounds of the formula:

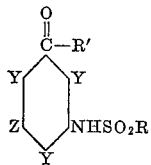

where R is a lower alkyl radical, R′ is —NH$_2$ or —OR″, where R″ is hydrogen, lower alkyl or a pharmaceutically acceptable cation; Y is hydrogen or iodine; and Z is —NO$_2$ or —NHX, where X is hydrogen or a lower acyl radical, and more particularly to alkylsulfonamidobenzoic acid compounds of the formula:

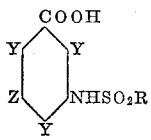

where R is a lower alkyl radical, Y is hydrogen or iodine, and Z is —NO$_2$, —NH$_2$ or —NH-lower carboxylic acyl, and the sodium and N-methylglucamine salts thereof. The invention also includes methods of preparing the novel compounds of the class described.

Among the objects of the invention may be mentioned the provision of new benzoic acid derivatives; the provision of new alkylsulfonamidobenzoic acid derivatives; the provision of new iodinated compounds; the provision of novel compounds which are useful intermediates for the preparation of new benzoic acid derivatives; and the provision of compounds of the type indicated which are useful for the preparation of roentgenographic contrast media. Other objects and features will be in part apparent and in part pointed out hereinafter.

The invention accordingly comprises the products and methods hereinafter described, the scope of the invention being indicated in the following claims.

The present invention is directed to the novel alkylsulfonamidobenzoic acids represented by the formula:

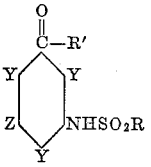

where R is a lower alkyl radical, R′ is —NH$_2$ or —OR″, where R″ is hydrogen, lower alkyl or a pharmaceutically acceptable cation; Y is hydrogen or iodine; and Z is —NO$_2$ or —NHX, where X is hydrogen or a lower acyl radical.

In the synthesis of the novel compounds of the invention it is convenient to use commercially available 3,5-dinitrobenzoic acid as the starting material. This compound is readily converted to 3-amino-5-nitrobenzoic acid by means well known to the art, such as selective reduction of one nitro group by means of ammonium sulfide.

The 3-amino-5-nitrobenzoic acid is next preferably converted to a 3-alkylsulfonamido-5-nitrobenzoic acid. This may be accomplished by heating the amino compound with an excess of an alkanesulfonating agent, such as an alkanesulfonyl halide, in the presence of a polar aprotic solvent, such as dioxane, and a tertiary organic base whose boiling point is not substantially lower than that of the solvent, such as pyridine, alkylpyridines or quinoline. The best yields are obtained if at least approximately an equivalent amount of pyridine is used. The pyridine increases the solubility of the 3-amino-5-nitrobenzoic acid and fills the useful function of forming a salt with the hydrogen halide that is formed as a by-product of the condensation of the amine with the alkanesulfonyl halide. When the alkanesulfonation is essentially complete the excess alkanesulfonyl halide is hydrolyzed in the presence of an excess of a basic solution, preferably ammonia solution. The resulting by-product alkanesulfonamide is then preferentially precipitated by careful adjustment of the pH of the system. A pH value of approximately 6 is suitable for this purpose.

The alkanesulfonation of the amino group tends to continue beyond the formation of the desired 3-alkylsulfonamido-5-nitrobenzoic acid, with the resultant formation of appreciable quantities of the corresponding disulfonyl compound. However, this additional reaction need not lower the yield of the primary product appreciably as the extra alkanesulfonyl group may be removed by hydrolysis in a warm solution of a strong base, such as sodium hydroxide. After hydrolysis of the by-product is complete, the desired 3-alkylsulfonamido-5-nitrobenzoic acid is precipitated by the addition of an excess of acid.

The remaining nitro group is now readily reduced, for example by catalytic hydrogenation, and the resulting amino compound is iodinated. Three iodine atoms may be readily introduced through the use of a strong iodinating agent, such as iodine monochloride, for example. The amino group is then conveniently acylated through the use of a good acylating agent, such as an acyl halide or an acid anhydride.

The novel amides of the invention are conveniently prepared by treating a 3-alkylsulfonamido-5-nitrobenzoic acid with thionyl chloride to form a 3-alkylsulfonamido-5-nitrobenzoyl chloride which may then be treated with ammonia to form the corresponding 3-alkylsulfonamido-5-nitrobenzamide. The nitro compound may then be reduced and the resulting amino compound successively iodinated and acylated by a series of reactions generally similar to that outlined above.

Salts and esters of the novel acids of the invention are conveniently prepared by means well known to those skilled in the art.

In this multi-step synthesis the order outlined above for the carrying-out of the various steps has been found to be the preferred one. Although other orders are theoretically possible they are less effective than the preferred procedure. For example, although the iodine may be readily introduced into 3-amino-5-nitrobenzoic acid it would be difficult to reduce the nitro group subsequently without removing at least a portion of the iodine at the same time.

The 3 - alkanamido - 5-alkylsulfonamido-2,4,6-triiodobenzoic acids of the present invention are useful for the preparation of roentgenographic contrast media. For example, concentrated sterile aqueous solutions of the salts of these acids with nontoxic cations are of low toxicity and contain a high concentration of organically bound and substantially physiologically inert iodine which can be administered intravascularly. These iodinated compounds are excreted primarily through the urinary system. The alkali metal and methylglucamine salts are particularly useful for the preparation of solutions for intravascular injection in connection with vasographic techniques, such as angiocardiography, peripheral arteriography, nephrography, and venography. Solutions in other pharmaceutically acceptable solvents are also useful for special purposes.

Dispersions of water-insoluble derivatives of the acids, such as their amides and esters, are also useful, as for example, in visualizing hollow organs and cavities having external orifices through which the contrast preparation can be introduced in preparation for the examination and removed after the examination is completed.

The compounds are also useful for the preparation of other types of contrast media such as, for example, non-aqueous dispersions.

As is evident from the preceding description of the synthetic processes used in preparing the compounds of the invention, the 3-alkylsulfonamido-5-nitrobenzoic acids, as well as the 3-amino-5-alkylsulfonamidobenzoic acids both iodinated and uniodinated, are useful intermediates for the preparation of the 3-alkanamido-5-alkylsulfonamido-2,4,6-triiodobenzoic acids and other useful compounds.

The following examples illustrate the invention.

EXAMPLE 1

3-Methylsulfonamido-5-Nitrobenzoic Acid

A mixture of 3-amino-5-nitrobenzoic acid (50 g., 0.274 mole), dioxane (300 ml.), pyridine (15 ml.) and methanesulfonyl chloride (150 g., 1.3 mole) was stirred and heated under reflux for 1½ hours. Additional pyridine (10 ml.) was added and the reaction allowed to proceed for an additional 2½ hours. The reaction mixture was cooled to room temperature and poured into dilute ammonia solution (250 ml. of 27% ammonia in 750 ml. of water). The mixture was cooled again, acidified with hydrochloric acid, made slightly alkaline with sodium hydroxide and finally acidified to pH 6 with acetic acid.

A precipitate of methanesulfonamide was filtered off and discarded, and the filtrate was treated with charcoal, filtered, acidified and refrigerated overnight. The precipitated crude 3-methylsulfonamido-5-nitrobenzoic acid was filtered off and heated on the steam bath for 2½ hours in a dilute sodium hydroxide solution (30 ml. of 50% NaOH in 500 ml. of water) to hydrolyze any disulfonimide present. The solution was then acidified (pH 5), treated with charcoal and filtered. The filtrate was made strongly acid and cooled, and the precipitated 3-methylsulfonamido-5-nitrobenzoic acid was filtered off and dried at 110° C. Yield, 34 g. (47.7%). M.P. 217.5–219.5 (corrected). Neutral equivalent, 259 (theory 260).

EXAMPLE 2

3-Amino-5-Methylsulfonamidobenzoic Acid 3-methylsulfonamido-5-nitrobenzoic acid (19.4 g., 0.0746 mole) was dissolved in water (200 ml.) containing an equivalent amount of sodium hydroxide. A catalyst (2 g. of 5% palladium on charcoal) was added and the solution was hydrogenated under pressure. Slightly more than the theoretical quantity of hydrogen was absorbed in 2½ hours, after which the catalyst was filtered off. The filtrate was diluted with water (600 ml.) and acidified with concentrated hydrochloric acid (15 ml.) to form a solution of 3-amino-5-methylsulfonamidobenzoic acid.

EXAMPLE 3

3-Amino-5-Methylsulfonamido-2,4,6-Triiodobenzoic Acid

A solution of iodine monochloride (42.2 g. of 95% ICl in 43 ml. of concentrated hydrochloric acid) was added all at once to the stirred solution of 3-amino-5-methylsulfonamidobenzoic acid from Example 2. After 15 minutes the stirred mixture was heated slowly to 70° C. and held at that temperature for 3½ hours. The slurry stood overnight and the slight excess of iodine monochloride was then reduced with sodium bisulfite. The 3-amino-5-methylsulfonamido-2,4,6-triiodobenzoic acid was filtered off and dried. Yield, 32 g. (70.5%, based on 3-methylsulfonamido-5-nitrobenzoic acid). Neutral equivalent, 610 (theory, 608).

EXAMPLE 4

3-Acetamido-5-Methylsulfonamido-2,4,6-Triiodobenzoic Acid

A mixture of 3-amino-5-methylsulfonamido-2,4,6-triiodobenzoic acid (78.0 g., 0.128 mole), acetic anhydride (130 ml., 1.4 mole) and sulfuric acid (1 ml.) was heated on a steam bath for 1 hour, during which most of the solid dissolved. The reaction mixture was poured into water (500 ml.) and the solution made slightly alkaline with sodium hydroxide. It was then acidified slightly (pH 5) with hydrochloric acid, treated four times with charcoal, diluted to one liter and hydrochloric acid added to form a white precipitate of 3-acetamido-5-methylsulfonamido-2,4,6-triiodobenzoic acid. This product was filtered off, washed, and dried thoroughly. Yield, 66.0 g. (79.1%). Calculated for $C_{10}H_9I_3N_2O_5S$: I, 58.7%; neutral equivalent, 650. Found: I, 57.1%; N.E., 652.

EXAMPLE 5

3-Acetamido-5-Methylsulfonamido-2,4,6-Triiodobenzoic Acid, Sodium Salt 3-acetamido-5-methylsulfonamido-2,4,6-triiodobenzoic acid was slurried in water and dissolved by the addition of an equivalent quantity of sodium hydroxide. The solution was evaporated to dryness to yield the sodium salt of 3-acetamido-5-methylsulfonamido-2,4,6-triiodobenzoic acid. Its solubility in water at 25° C. is approximately 32.7 g./100 ml. of solution (37.6 g./100 ml. of water).

EXAMPLE 6

3-Acetamido-5-Methylsulfonamido-2,4,6-Triiodobenzoic Acid, N-Methyl-Glucamine Salt The N-methylglucamine salt of 3-acetamido-5-methylsulfonamido-2,4,6-triiodobenzoic acid was prepared by a process generally similar to that described in Example 5, an equivalent quantity of N-methylglucamine being substituted for the sodium hydroxide there specified. The solubility of the N-methylglucamine salt in water at 25° C. is approximately 70.6 g./100 ml. of solution (108 g./100 ml. of water).

The acute intravenous $LD_{50}$ of this salt in male albino mice was found to be approximately 14.7 g./kg.

Following intravenous administration of a 40% (w./v.) solution of this salt to a dog at a dosage of 100 mg./kg., X-ray films of the kidneys and the urinary bladder were obtained in 10 minutes. The bladder shadows became as dense as those of the animal's bones about two hours after administration of the contrast agent.

EXAMPLE 7

3-Ethylsulfonamido-5-Nitrobenzoic Acid 3-amino-5-nitrobenzoic acid (50 g., 0.274 mole) was laregly dissolved in dioxane (300 ml.) and ethanesulfonyl chloride (120 g., 0.93 mole) and pyridine (15 ml.) were added. The system was stirred and heated under reflux for an hour. Then more pyridine (10 ml.) was added and the stirring and heating were continued for an additional three hours. The clear solution was cooled and poured into dilute ammonia solution (250 ml. of 27% ammonia in 700 ml. of water). The mixture was acidified with hydrochloric acid, made slightly alkaline with sodium hydroxide and again slightly acidified (pH 6) with acetic acid. The precipitated ethanesulfonamide was filtered off and discarded. The filtrate was treated with charcoal which was filtered off, and the filtrate was acidified with hydrochloric acid. The brown precipitate was filtered off and the filtrate concentrated to about 800 ml. The additional precipitate which formed on standing was filtered off and combined with the first precipitate. The combined precipitates were warmed in dilute sodium hydroxide solution, after which the solution was slightly acidified with acetic acid, treated with charcoal and filtered. Hydrochloric acid was then added to precipitate 3-ethylsulfonamido-5-nitrobenzoic acid, which was filtered off and dried. Yield, 8.0 g. N.E. 280 (theory, 274).

EXAMPLE 8

*3-Amino-5-Ethylsulfonamidobenzoic Acid*

3-ethylsulfonamido-5-nitrobenzoic acid (16.0 g., 0.0584 mole) was dissolved in denatured alcohol (150 ml., S.D. Formula 13A) and hydrogenated under pressure in the presence of a catalyst (2 g. of 5% palladium on charcoal). Slightly less than the theoretical quantity of hydrogen was absorbed. The catalyst was filtered off and the alcohol evaporated, leaving the product, 3-amino-5-ethylsulfonamidobenzoic acid, as a viscous oil.

EXAMPLE 9

*3-Amino-5-Ethylsulfonamido-2,4,6-Triiodobenzoic Acid*

The 3-amino-5-ethylsulfonamidobenzoic acid from Example 8 was dissolved in concentrated hydrochloric acid (15 ml.) and sufficient water to bring the volume to 500 ml. Iodine monochloride (31 g. of 95% ICl in 31 ml. of 37% hydrochloric acid) was added, and the solution was stirred and warmed slowly to 70° C. After a half hour the mixture was diluted to 800 ml. and allowed to stand for about 24 hours. The slight excess of iodine monochloride was then reduced with sodium bisulfite and the crude product filtered off. It was dissolved in dilute sodium hydroxide solution, which was then slightly acidified with acetic acid, treated with charcoal and filtered. To the filtrate was added concentrated hydrochloric acid to precipitate 3-amino-5-ethylsulfonamido-2,4,6-triiodobenzoic acid. N.E., 619 (theory, 622).

EXAMPLE 10

*3-Acetamido-5-Ethylsulfonamido-2,4,6-Triiodobenzoic Acid*

A mixture of 3-amino-5-ethylsulfonamido-2,4,6-triiodobenzoic acid (15 g., 0.024 mole), acetic anhydride (30 ml., 0.32 mole), and sulfuric acid (3 drops) was heated on a steam bath for an hour and then poured into a larger volume of water. A slight excess of sodium hydroxide was added and the solution was then acidified slightly with acetic acid and treated several times with charcoal. Hydrochloric acid was then added and the resulting precipitate was filtered off, extracted with dioxane, washed with acetone and dried. Yield, 10 g. of 3-acetamido-5-ethylsulfonamido-2,4,6-triiodobenzoic acid hemihydrate. N.E., 672 (theory, 673). The product darkened at 255° C. but did not melt below 300° C.

EXAMPLE 11

*3-Acetamido-5-Ethylsulfonamido-2,4,6-Triiodobenzoic Acid, Sodium Salt*

The sodium salt of 3-acetamido-5-ethylsulfonamido-2,4,6-triiodobenzoic acid was prepared by a procedure generally similar to that outlined in Example 5. The solubility of this salt at 25° C. is greater than 76 g./100 ml. of solution (greater than 110 g./100 ml. of water).

EXAMPLE 12

*3-Acetamido-5-Ethylsulfonamido-2,4,6-Triiodobenzoic Acid, N-Methylglucamine Salt*

3 - acetamido - 5 - ethylsulfonamido - 2,4,6 - triiodobenzoic acid (7.73 g.) and N-methylglucamine (2.27 g.) were dissolved in sufficient water to make 40 ml. The resulting solution contained 40% (w./v.) of the N-methylglucamine salt of 3-acetamido-5-ethylsulfonamido-2,4,6-triiodobenzoic acid.

The intravenous $LD_{50}$ of this salt in male albino mice was found to be greater than 14.7 g./kg. This was the highest dosage level tested and was below the lethal range.

It will be understood that other 3-lower alkylsulfonamido-5-nitrobenzoic acids, 3-amino-5-lower alkylsulfonamidobenzoic acids and 3-lower alkanamido-5-lower alkylsulfonamidobenzoic acids may be prepared by the methods illustrated in the foregoing examples. Also, it is to be understood that other customary nontoxic salts may be conveniently prepared and employed in accordance with the present invention.

In view of the above, it will be seen that the several objects of the invention are achieved and other advantageous results obtained.

As various changes could be made in the above products and processes without departing from the scope of the invention, it is intended that all matter contained in the above description shall be interpreted as illustrative and not in a limiting sense.

We claim:

1. A compound selected from the group consisting of an alkylsulfonamidobenzoic acid of the formula:

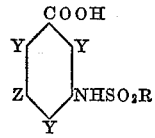

where R is a lower alkyl radical, Y is selected from the group consisting of hydrogen and iodine and Z is selected from the group consisting of $NO_2$, $NH_2$ and NH-lower carboxylic acyl, and the sodium and N-methyl-glucamine salts thereof.

2. A 3-lower alkylsulfonamido-5-nitrobenzoic acid.
3. A 3-amino-5-lower alkylfonamidobenzoic acid.
4. A 3-amino-5-lower alkylsulfonamido-2,4,6-triodobenzoic acid.
5. A 3-lower alkanamido-5-lower alkylsulfonamido-2,4,6-triiodobenzoic acid.
6. 3-acetamido-5-methylsulfonamido - 2,4,6-triiodobenzoic acid.
7. The sodium salt of 3-acetamido-5-methylsulfonamido-2,4,6-triiodobenzoic acid.
8. The N-methylglucamine salt of 3-acetamido-5-methylsulfonamido-2,4,6-triiodobenzoic acid.
9. 3 - acetamido - 5 - ethylsulfonamido - 2,4,6 - triodobenzoic acid.
10. The sodium salt of 3-acetamido-5-ethylsulfonamido-2,4,6-triiodobenzoic acid.
11. The N-methylglucamine salt of 3-acetamido-5-ethylsulfonamido-2,4,6-triiodobenzoic acid.

References Cited in the file of this patent

UNITED STATES PATENTS 2,531,367    Sprague    Nov. 21, 1950

FOREIGN PATENTS 748,319    Great Britain    Apr. 25, 1956

OTHER REFERENCES

Wagner et al.: Synthetic Organic Chemistry, pages 99, 567–8, 654–7 and 822–3 (1953).

Ser. No. 377,842, Wagner et al. (A.P.C.), published June 8, 1943.